US012752388B2

(12) United States Patent
Noguchi

(10) Patent No.: US 12,752,388 B2
(45) Date of Patent: Oct. 6, 2026

(54) TOOL MANAGEMENT SYSTEM AND TOOL MANAGEMENT DEVICE

(71) Applicant: OKUMA CORPORATION, Niwa-Gun (JP)

(72) Inventor: Shinya Noguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 248 days.

(21) Appl. No.: 18/800,205

(22) Filed: Aug. 12, 2024

(65) Prior Publication Data

US 2025/0065463 A1 Feb. 27, 2025

(30) Foreign Application Priority Data

Aug. 25, 2023 (JP) ................................ 2023-137492

(51) Int. Cl.
*B23Q 15/28* (2006.01)

(52) U.S. Cl.
CPC .................................. *B23Q 15/28* (2013.01)

(58) Field of Classification Search
None
See application file for complete search history.

(56) References Cited

U.S. PATENT DOCUMENTS

2020/0033836 A1* 1/2020 Hayashi ........... G05B 19/40938

FOREIGN PATENT DOCUMENTS

JP 2021-142613 A 9/2021

* cited by examiner

*Primary Examiner* — Ryan A Jarrett
(74) *Attorney, Agent, or Firm* — Muncy, Geissler, Olds & Lowe, P.C.

(57) ABSTRACT

A tool management system includes a tool management device and an information input and output terminal. The tool management device manages an assembled tool including a tool holder and a cutting tool mounted on the tool holder. The information input and output terminal is configured to input and output data to/from the tool management device. The tool management device includes a tool information database and a data retrieval unit. The data retrieval unit retrieves the assembled tool ID including the input tool holder ID to make information relating to the same assembled tool referable when the assembled tool determination unit has determined that the tool holder is holding the cutting tool, and retrieves the input tool holder ID to make information relating to the same tool holder referable when the assembled tool determination unit has determined that the tool holder is not holding the cutting tool.

8 Claims, 8 Drawing Sheets

TOOL MANAGEMENT SYSTEM AND TOOL MANAGEMENT DEVICE

CROSS REFERENCE TO RELATED APPLICATION

This application claims the benefit of Japanese Patent Application Number 2023-137492 filed on Aug. 25, 2023, the entirety of which is incorporated by reference.

FIELD OF THE INVENTION

The disclosure relates to a system and a device for managing a tool used in machining with a machine tool.

BACKGROUND OF THE INVENTION

In a machine tool that executes a cutting, a cutter tool uses a cutting tool t, such as an end mill and a drill, assembled on a holder, referred to as a tool holder HL, as illustrated in FIG. 1A. Here, a cutter tool AS with the cutting tool t assembled on the tool holder HL is referred to as an "assembled tool AS." Regarding management of the assembled tool AS, there has been known a managing method. The known method assigns code information for identifying a tool ID (tool number) as a unique identifier to the tool holder HL, and associates the tool number with a machining number used in the machining program, as disclosed in JP 2021-142613 A.

Assume that, when an assembled tool AS that has been used in machining a certain workpiece W' (not illustrated) is used in machining another workpiece W in one machine, when the assembly tool AS is moved in the direction of the arrow, an interference between the workpiece W and the cutting tool t may be occurred as illustrated in FIG. 1A. Therefore, in order to avoid an interference between the workpiece W and the cutting tool t when the assembly tool AS is moved in the direction of the arrow, a projection amount of the cutting tool t is adjusted as illustrated in FIG. 1B. According to the disclosure in JP 2021-142613 A, it is necessary to remeasure a tool length after the adjustment and change compensation value information, and since the tool number of the tool holder HL are the same before and after the adjustment, the compensation value information is to be overwritten. Therefore, the projection amount of the assembled tool AS and the compensation value from the previous time are eliminated. For example, when machining of the workpiece W' that has been previously machined is repeated, there is a possibility of interference caused by using the assembled tool AS with an incorrect compensation value because of the tool number being the same.

Further, not only for avoiding the interference, but also for the reason of machining, a cutting tool t1 in FIG. 2A is changed to a cutting tool 2 in FIG. 2B having the same diameter but a different edge length in some cases, but the tool number of the tool holder HL are the same before and after the change in the case too. Furthermore, even when a cutting tool t3 of different type is used as in FIG. 3, the tool number of the tool holder HL are the same before and after the change.

Attempting to change the tool ID and the tool number requires to change the code information assigned to the tool holder HL, which causes a labor. Furthermore, changing the code information makes the log unknown, which makes it difficult to deal with the repeated machining. When the code information is not changed, it is necessary to prepare another set of the tool holder HL and the cutting tool t, and therefore, it costs.

On the other hand, in the aspect of operation of the assembled tool AS in a plurality of machines, the assembled tool AS is commonly usable among the plurality of machine tools when the specifications of the tool holders HL are the same. However, the tool numbers are determined for the respective machines. It is also allowed to use a common tool number operational system among the plurality of machines, which allows a common tool number to be used as an unchangeable tool number as in JP 2021-142613 A. However, in view of specification restrictions of the respective machines, the usable number of digits of the tool number often differs from one another, which causes a trouble.

Therefore, it is an object of the disclosure to provide a tool management system and a tool management device that facilitate management of an assembled tool, and enable reliably storing post-change information even though a configuration of the assembled tool has been changed, thereby being able to deal with repeated machining in a short time.

SUMMARY OF THE INVENTION

In order to achieve the above-described object, a first configuration of the disclosure is a tool management system including a tool management device and an information input and output terminal. The tool management device manages an assembled tool including a tool holder and a cutting tool mounted on the tool holder. The information input and output terminal is configured to input and output data to/from the tool management device. The tool management device includes a tool information database, an assembled tool ID generation unit, a data retrieval unit, and an assembled tool determination unit. The tool information database stores at least: a tool holder ID as unique identification information directly attached to the tool holder; tool holder information as information relating to the tool holder; an assembled tool ID as unique identification information of the assembled tool; machine information as information relating to a machine tool that uses the assembled tool; workpiece information as information relating to a workpiece that has been machined using the assembled tool; cutting tool information as information relating to the cutting tool; a projection amount of the cutting tool from the tool holder in the assembled tool; and an assembled tool state flag turned ON when the cutting tool is mounted on the tool holder and turned OFF when the cutting tool is removed. The assembled tool ID generation unit generates the assembled tool ID in a record including the tool holder ID in the tool information database when the cutting tool is mounted on the tool holder. The data retrieval unit retrieves necessary information from the tool information database. The assembled tool determination unit determines whether the tool holder is holding the cutting tool or not. The information input and output terminal includes an input unit for the tool holder ID. The assembled tool determination unit determines that the tool holder is holding the cutting tool when the tool holder ID is input by the input unit with the assembled tool state flag being in an ON state, and determines that the tool holder is not holding the cutting tool when the tool holder ID is input by the input unit with the assembled tool state flag being in an OFF state. The data retrieval unit retrieves the assembled tool ID including the input tool holder ID to make information relating to the same assembled tool referable when the assembled tool determination unit has determined that the tool holder is holding the cutting tool, and retrieves the input tool holder ID to make information relating to the same tool holder referable when the assembled tool determination unit has determined that the tool holder is not holding the cutting tool.

In another aspect of the first configuration, which is in the above-described configuration, the assembled tool determination unit refers to a latest record among records including the corresponding tool holder ID when the tool holder ID is input.

In another aspect of the first configuration, which is in the above-described configuration, the assembled tool ID generation unit adds a record, in which the assembled tool ID and the cutting tool information having been changed, to the tool information database when the configuration of the assembled tool is changed.

In another aspect of the first configuration, which is in the above-described configuration, the assembled tool ID generation unit adds a record with the assembled tool ID and the projection amount having been changed when the projection amount is changed in the assembled tool.

Another aspect of the first configuration, which is in the above-described configuration, further includes a tool number generation unit that assigns a tool number for a machine tool to identify to the assembled tool. When the data retrieval unit has retrieved the assembled tool including the same tool holder and the same cutting tool, the tool number generation unit is allowed to assign the same tool number as the retrieved assembled tool.

In another aspect of the first configuration, which is in the above-described configuration, the tool number generation unit is configured to set the tool number for each of the machine tools.

In another aspect of the first configuration, which is in the above-described configuration, the data retrieval unit is configured to retrieve the assembled tool used in machining for each workpiece.

In order to achieve the above-described object, a second configuration of the disclosure is a tool management device that manages an assembled tool including a tool holder and a cutting tool mounted on the tool holder including a tool information database, an information input and output unit, an assembled tool ID generation unit, a data retrieval unit, and an assembled tool determination unit. The tool information database stores at least: a tool holder ID as unique identification information directly attached to the tool holder; tool holder information as information relating to the tool holder; an assembled tool ID as unique identification information of the assembled tool; machine information as information relating to a machine tool that uses the assembled tool; workpiece information as information relating to a workpiece that has been machined using the assembled tool; cutting tool information as information relating to the cutting tool; a projection amount of the cutting tool from the tool holder in the assembled tool; and an assembled tool state flag turned ON when the cutting tool is mounted on the tool holder and turned OFF when the cutting tool is removed. The information input and output unit includes an input unit for the tool holder ID and is configured to input and output each piece of data to/from the tool information database. The assembled tool ID generation unit generates the assembled tool ID in a record including the tool holder ID in the tool information database when the cutting tool is mounted on the tool holder. The data retrieval unit retrieves necessary information from the tool information database. The assembled tool determination unit determines whether the tool holder is holding the cutting tool or not. The assembled tool determination unit determines that the tool holder is holding the cutting tool when the tool holder ID is input by the input unit with the assembled tool state flag being in an ON state, and determines that the tool holder is not holding the cutting tool when the tool holder ID is input by the input unit with the assembled tool state flag being in an OFF state. The data retrieval unit retrieves the assembled tool ID including the input tool holder ID to make information relating to the same assembled tool referable when the assembled tool determination unit has determined that the tool holder is holding the cutting tool, and retrieves the input tool holder ID to make information relating to the same tool holder referable when the assembled tool determination unit has determined that the tool holder is not holding the cutting tool.

According to the disclosure, the assembled tool ID is referred when the assembled tool state flag is ON, and the tool holder ID is referred when the assembled tool state flag is OFF. Thus, the disclosure facilitates management of an assembled tool and enables reliably storing post-change information even though a configuration of the assembled tool has been changed. Therefore, the information includes the assembled tool that has been used on a workpiece with a machined record is identifiable, thereby achieving a shortened period in dealing with repeated machining.

DETAILED DESCRIPTION OF THE INVENTION

The following describes embodiments of the disclosure based on the drawings.

Figure 4:
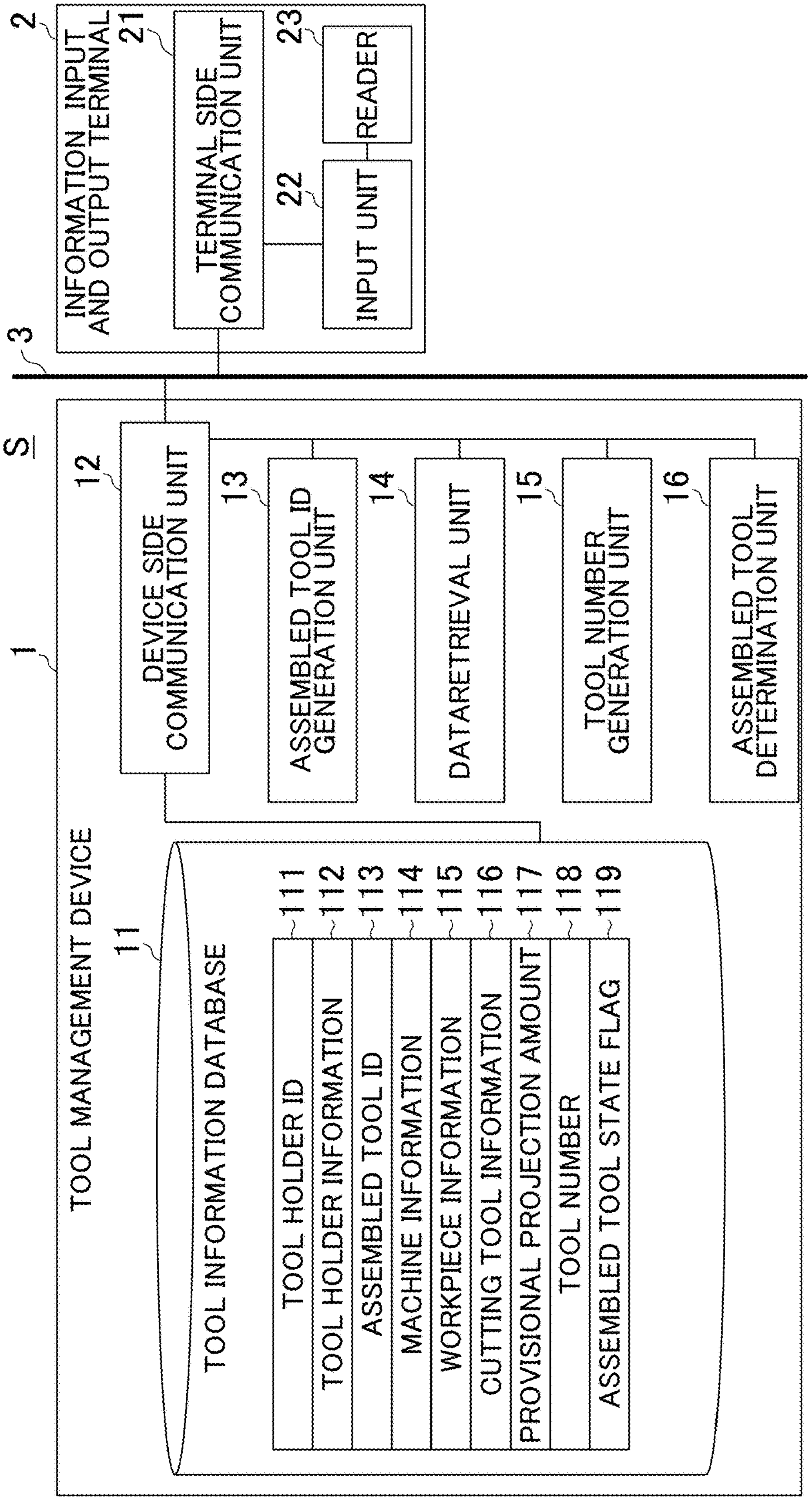
FIG. 4 is a block diagram of a tool management system.

FIG. 4 is a block diagram illustrating an exemplary tool management system according to a first configuration of the disclosure.

The tool management system S includes a tool management device 1, an information input and output terminal 2, and a network 3, and manages a tool holder HL and an assembled tool AS to which unique identification information is assigned.

The tool management device 1 includes a tool information database 11, a device side communication unit 12, an assembled tool ID generation unit 13, a data retrieval unit 14, a tool number generation unit 15, and an assembled tool determination unit 16, as a configuration unit. The tool management device 1 is configured by including a CPU and a memory connected to the CPU for achieving operations of the assembled tool ID generation unit 13, the data retrieval unit 14, the tool number generation unit 15, and the assembled tool determination unit 16.

The tool information database 11 stores a tool holder ID 111, tool holder information 112 as information relating to the tool holder HL, an assembled tool ID 113, machine information 114 as information relating to a machine tool using the assembled tool AS, workpiece information 115 as information relating to a workpiece that has been machined using the assembled tool AS, cutting tool information 116 as information relating to a cutting tool t, a provisional projection amount 117 as a projection amount of the cutting tool t from the tool holder HL, a tool number 118, and an assembled tool state flag 119, as exemplary data.

The assembled tool ID 113 is the unique number used in the tool management system S. When the assembled tool AS is made by mounting the cutting tool t on the tool holder HL, the assembled tool ID generation unit 13 automatically generates the assembled tool ID 113. When any one of the tool holder HL and the cutting tool tis changed or when the projection amount of the cutting tool t is changed, the assembled tool ID 113 is automatically generated.

The tool number 118 is the number assigned conveniently by an operator in order to call the assembled tool AS when the assembled tool AS is mounted on a stand-by station or on a main spindle after the assembled tool AS is stored in a tool magazine of an ATC in a machine tool. The tool number 118 is assigned per machine tool.

Regarding the tool holder HL, the tool holder information 112 including a model is registered in the tool information database 11, and the tool holder ID 111 is assigned as unique identification information of the tool holder HL. The tool holder ID 111 is attached to the tool holder HL in a form of, for example, a one-dimensional barcode, a two-dimensional barcode, RFID, or a character, as an automatic recognition tag.

The information input and output terminal 2 includes a terminal side communication unit 21 and an input unit 22. The input unit 22 includes a reader 23 that reads the automatic recognition tag attached to the tool holder HL. The input unit has a broad meaning, and the reader 23 is included in the input unit of the disclosure. The information input and output terminal 2 may be one that includes, for example, a display part, a storage device, and a central processing unit, like a personal computer or a mobile terminal. The information input and output terminal 2 may input and communicate like a barcode reader and decode the input data using another personal computer connected via a network (not illustrated). There may be a plurality of the information input and output terminals 2.

Figure 5:
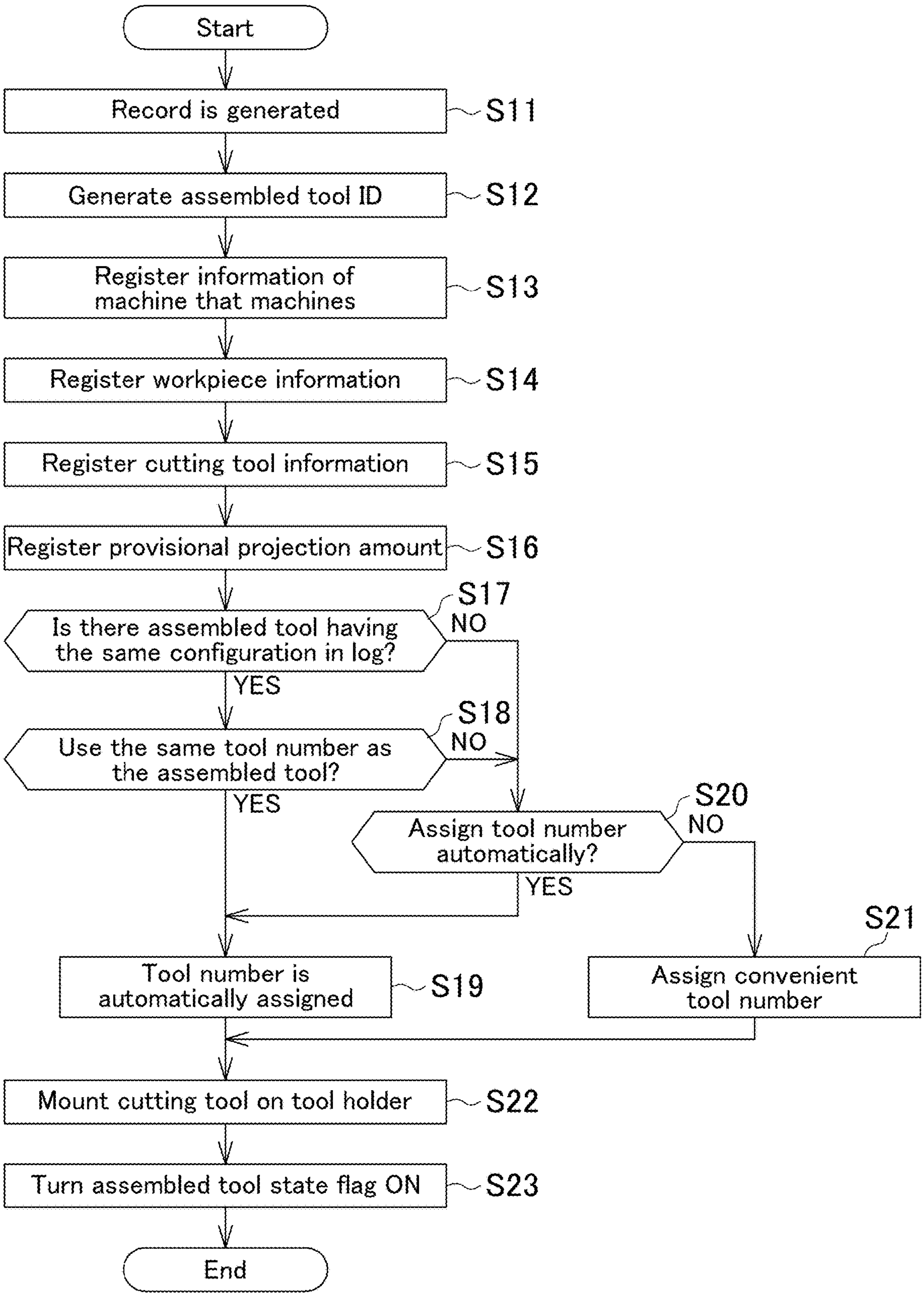
FIG. 5 is a flowchart of information processing when the cutting tool is mounted on a tool holder.
Figure 6:
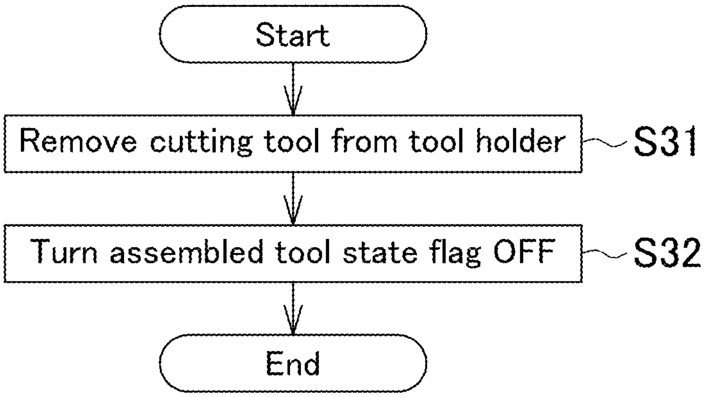
FIG. 6 is a flowchart of information processing when the cutting tool is removed from the tool holder.
Figure 7:
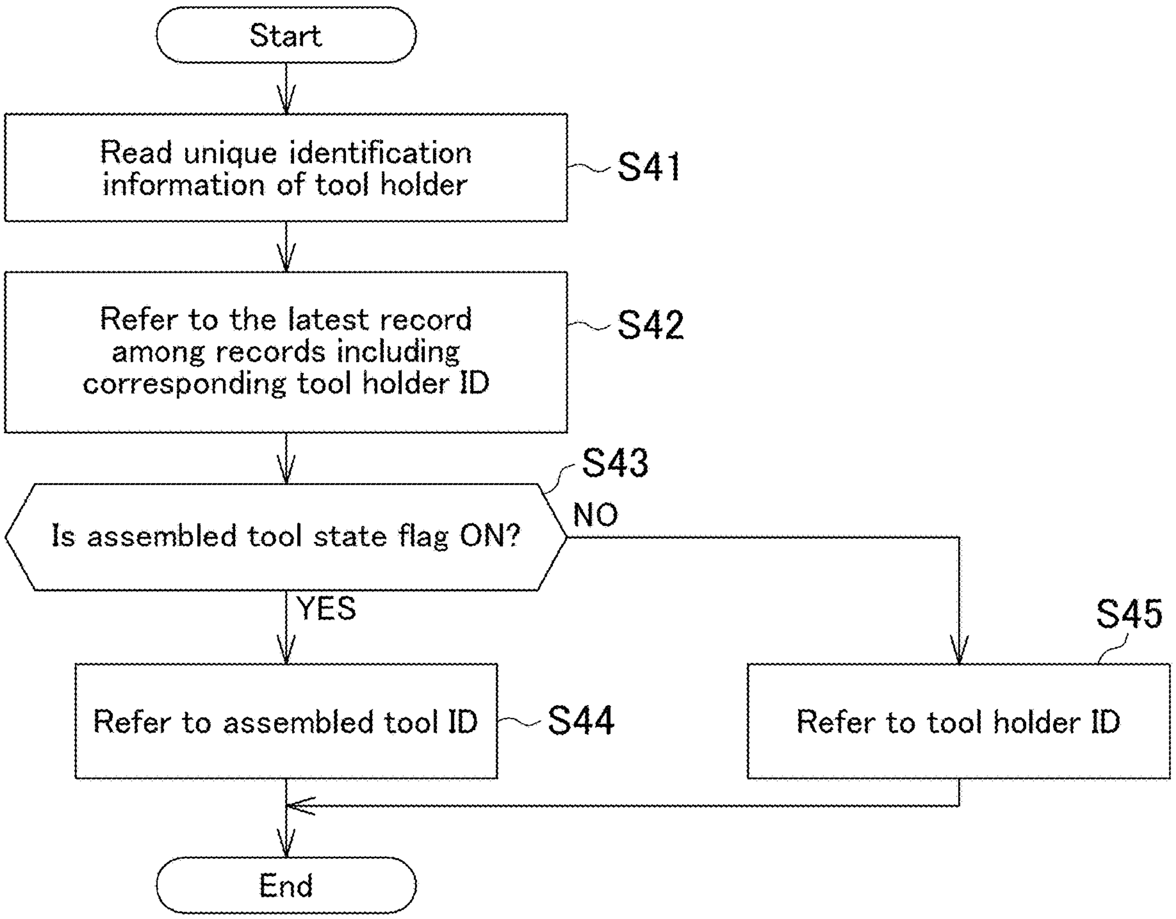
FIG. 7 is a flowchart of information processing when a log relating to an assembled tool is retrieved.

The following describes information processing by the tool management device 1 based on the flowcharts in FIG. 5 to FIG. 7.

FIG. 5 illustrates information processing when the cutting tool t is mounted on the tool holder HL.

When the cutting tool t is mounted on the tool holder HL, a command from the operator via the information input and output terminal 2 causes the assembled tool ID generation unit 13 to add a new record to the tool information database 11 at S11, and to generate the assembled tool ID 113 as unique identification information of the assembled tool AS at S12.

Next, the machine information 114 including a name and specifications of the machine tool that machines the workpiece is registered in the record at S13.

Next, the workpiece information 115 including a type number, a material, and main contractor information is registered in the record at S14.

Next, the cutting tool information 116 including a tool diameter and a tool type is registered in the record at S15.

Next, the provisional projection amount 117 as a guide projection amount when the cutting tool t is mounted on the tool holder HL is registered in the record at S16. The registered information at S13 to S16 is input by the information input and output terminal 2 and is stored in the record added to the tool information database 11.

The machine information 114 may include a machine information table that stores the information associated machine IDs for facilitating the management when there are a plurality of machine tools. Similarly, the workpiece information 115 may include a workpiece information table that stores the information associated workpiece IDs.

The information of the record added to the tool information database 11 is compared with the past records and retrieved by the data retrieval unit 14. At S17, the data retrieval unit 14 determines whether the information of the newly added record matches the tool holder information 112 and the cutting tool information 116 in the past records or not, that is, whether the assembled tool AS that has the same configuration exists in the log or not. Here, when it is confirmed that there is the log of the same assembled tool AS, the operator selects whether to use the same tool number as that of the assembled tool AS or not at S18. When using the same tool number is selected, the same tool number 118 is automatically assigned and stored in the record in the tool number generation unit 15 at S19.

On the other hand, when it is confirmed that there is no assembled tool AS having the same configuration in the log in the determination at S17, or when there is the assembled tool AS having the same configuration in the log but the selection of not using the same tool number as that of the assembled tool AS is made in the determination at S18, a selection is made whether a new tool number is automatically assigned or not in a determination at S20. Here, when the operator selects the automatic assignment of the tool number, the tool number 118 is automatically assigned in the tool number generation unit 15 at S19. Otherwise, the operator assigns the convenient tool number 118 (for example, a branch number of the original tool number) and stores it in the record at S21. The tool number 118 is, for example, managed by being associated with the assembled tool ID 113 and the machine information 114 in the machine information data table, and can be numbered for each machine.

After the tool number 118 is thus assigned, the cutting tool t is mounted on the tool holder HL at S22, and the assembled tool state flag 119 is turned ON at S23. Regarding the assembled tool state flag 119, the assembled tool ID generation unit 13, which has determined that the tool holder HL and the cutting tool t are physically connected by using a camera or a sensor, automatically turns the assembled tool state flag 119 ON (not illustrated). However, the assembled tool state flag 119 may be manually turned ON by the operator.

FIG. 6 illustrates information processing when the cutting tool t is removed from the tool holder HL. When the cutting tool t is removed from the tool holder HL at S31, the assembled tool state flag 119 is turned OFF at S32. The turning OFF of the assembled tool state flag 119 may also be automatic or be manual.

FIG. 7 is a flowchart of information processing when the log relating to the assembled tool AS is retrieved.

First, the unique identification information of the tool holder HL is read by the reader 23 of the input unit 22 at S41. The read unique identification information is input to the assembled tool determination unit 16 of the tool management device 1.

Next, the assembled tool determination unit 16 refers to the latest record among the records including the corresponding tool holder ID 111 at S42.

Next, whether the assembled tool state flag 119 is ON or not is determined at S43. When it is confirmed that the assembled tool state flag 119 is ON, that is, the cutting tool t is mounted on the tool holder HL here, the unique identification information becomes the assembled tool ID 113 at S44, and the tool holder information 112, the machine information 114, the workpiece information 115, the cutting tool information 116, the provisional projection amount 117, and the tool number 118 of the same record are referred.

On the other hand, when it is confirmed that the assembled tool state flag 119 is OFF, that is, the cutting tool t is not mounted on the tool holder HL in the determination at S43, the unique identification information becomes the tool holder ID 111 at S45, and the tool holder information 112 is referred.

As the result of the reference, when there is the tool holder HL without the cutting tool t mounted on it, the new assembled tool AS is allowed to be made by combining the desired cutting tool t. In the case, including the cases where the projection amount of the cutting tool t is changed and where the cutting tool t is replaced, the information processing in FIG. 5 is performed. That is, a record is newly added (S11), the assembled tool ID 113 is newly generated (S12), and the machine information and the workpiece information are registered (S13, S14). The tool holder information 112 and the cutting tool information 116 of the record including the original assembled tool ID 113 is taken over (S15), the new provisional projection amount 117 is registered (S16), and the tool number 118 is newly assigned and the assembled tool state flag 119 is turned ON (S17 to S23). Thus, the information of the current assembled tool AS having the changed configuration is newly stored.

Accordingly, when the repeated machining of the workpiece that has been previously machined is performed, retrieving the tool holder information 112, the cutting tool information 116, the provisional projection amount 117, and the tool number 118 associated with the workpiece information 115 in the data retrieval unit 14 enables machining preparation in a short time.

Thus, in the tool management system S and the tool management device 1 having the above-described configuration, the assembled tool determination unit 16 determines that the tool holder HL is holding the cutting tool t when the reader 23 reads the tool holder ID 111 with the assembled tool state flag 119 being ON. On the other hand, the assembled tool determination unit 16 determines that the tool holder HL is not holding the cutting tool t when the reader 23 reads the tool holder ID 111 with the assembled tool state flag 119 being OFF.

The data retrieval unit 14 then retrieves the assembled tool ID 113 including the read tool holder ID 111 to enable referring to the information relating to the same assembled tool AS when the assembled tool determination unit 16 has determined that the tool holder HL is holding the cutting tool t. On the other hand, the data retrieval unit 14 retrieves the read tool holder ID 111 to enable referring to the information relating to the same tool holder HL when the assembled tool determination unit 16 has determined that the tool holder HL is not holding the cutting tool t.

The above mentioned configuration facilitates the management of the assembled tool AS, and enables reliably storing the post-change information even though the configuration of the assembled tool AS has been changed. Accordingly, the assembled tool AS that has been used on the workpiece with a machined record, the configuration, the tool number, and the projection amount thereof can be identified, thereby achieving a shortened period in dealing with the repeated machining.

Figure 8:
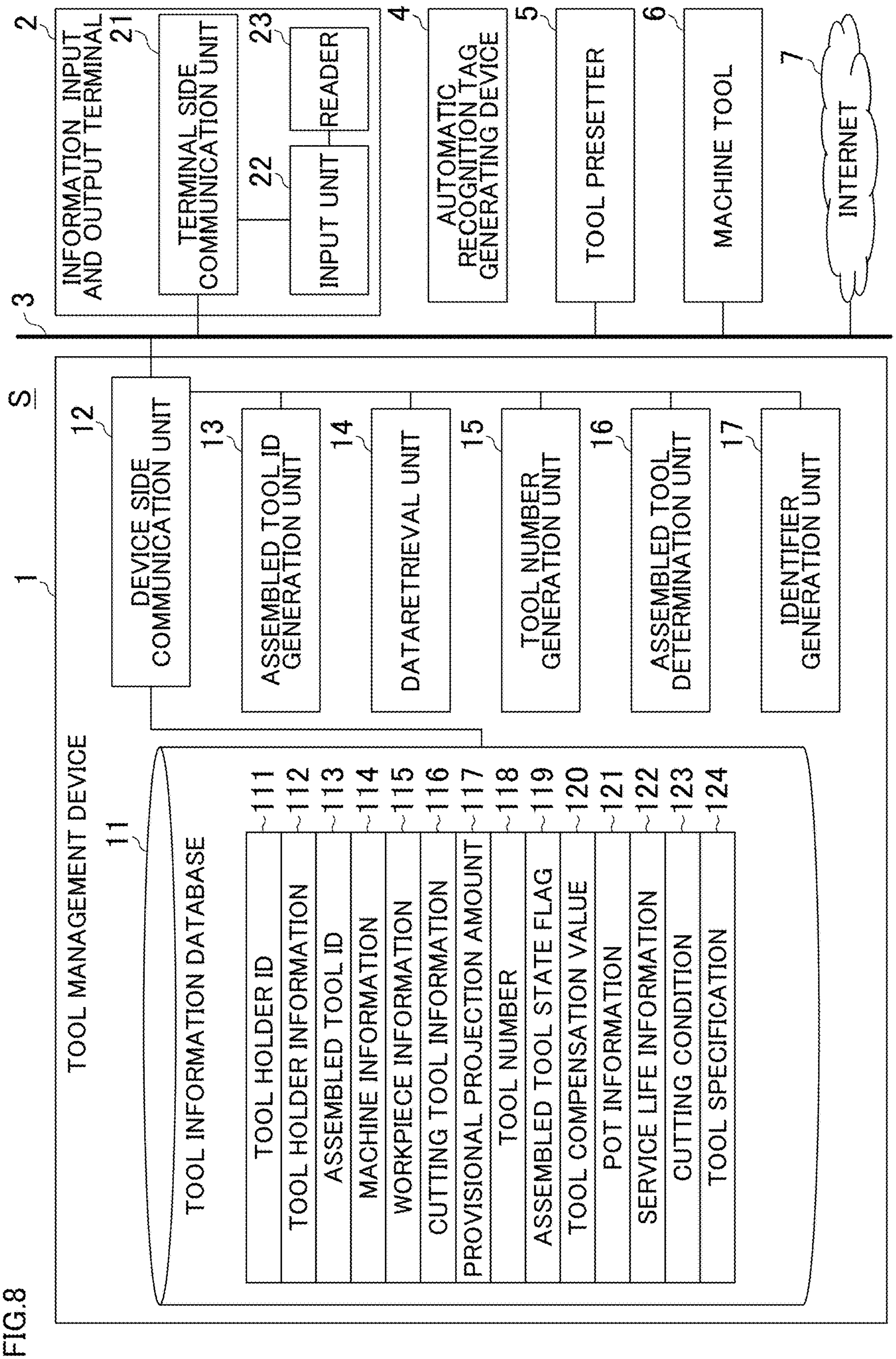
FIG. 8 is a block diagram illustrating a modification example of the tool management system.

FIG. 8 illustrates a modification example of the tool management system S.

Figure 1A:
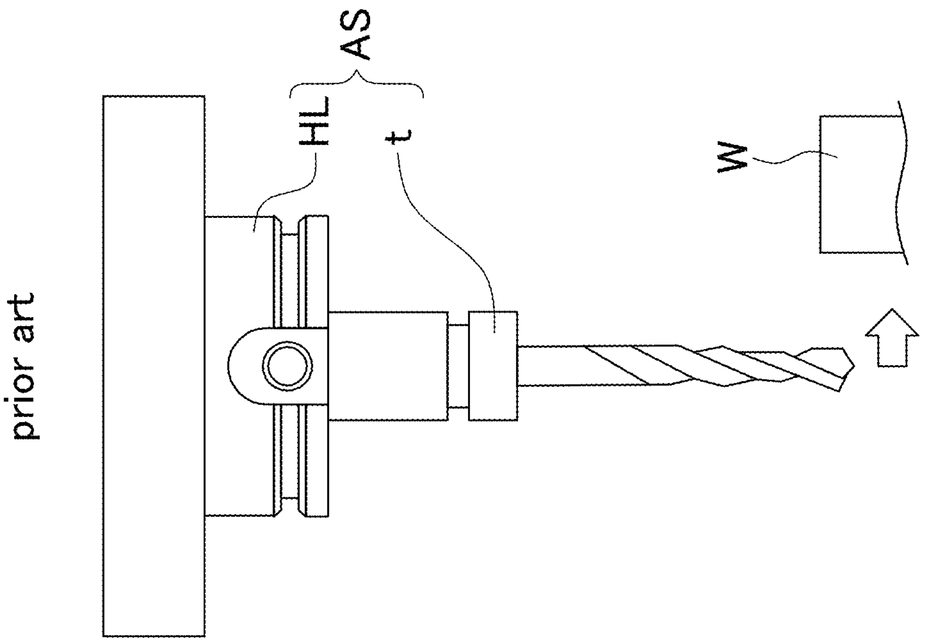
FIG. 1A is an explanatory view when a projection amount of a cutting tool is adjusted, and illustrates a state before the adjustment.
Figure 1B:
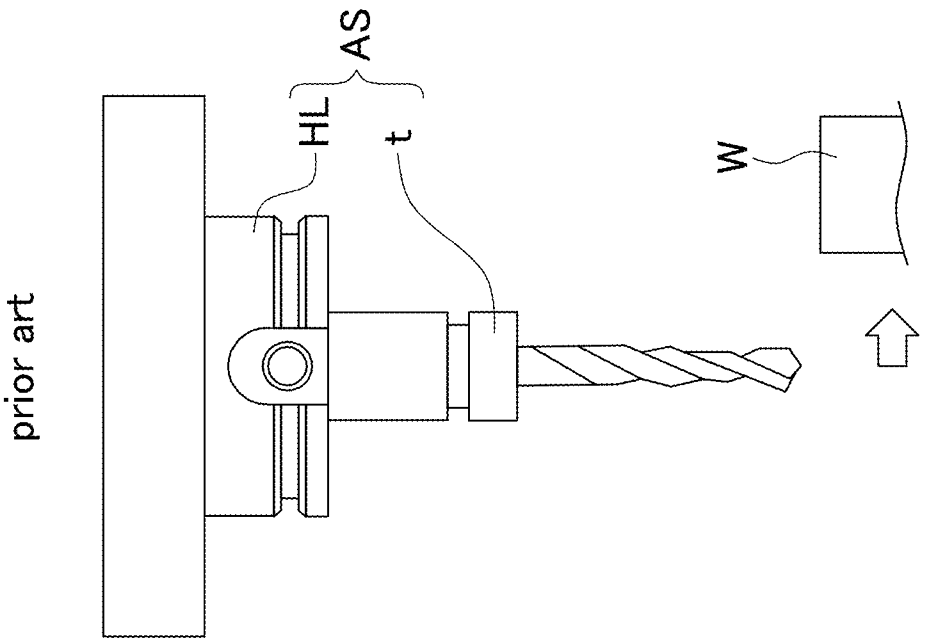
FIG. 1B is an explanatory view when the projection amount of the cutting tool is adjusted, and illustrates a state after the adjustment.
Figure 2A:
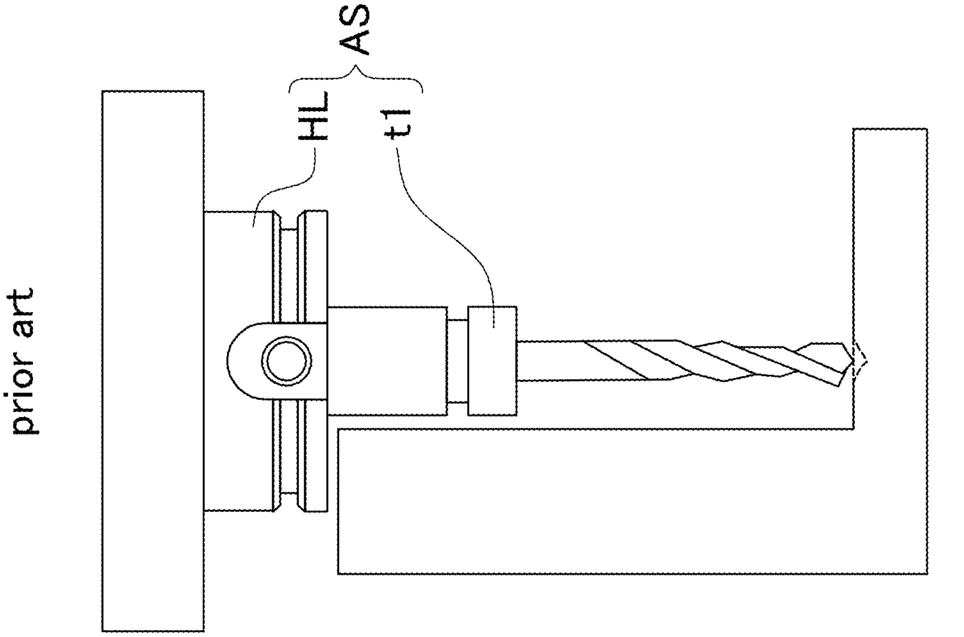
FIG. 2A is an explanatory view when the cutting tool is changed to a cutting tool having the same diameter but a different edge length, and illustrates a state before the change.
Figure 2B:
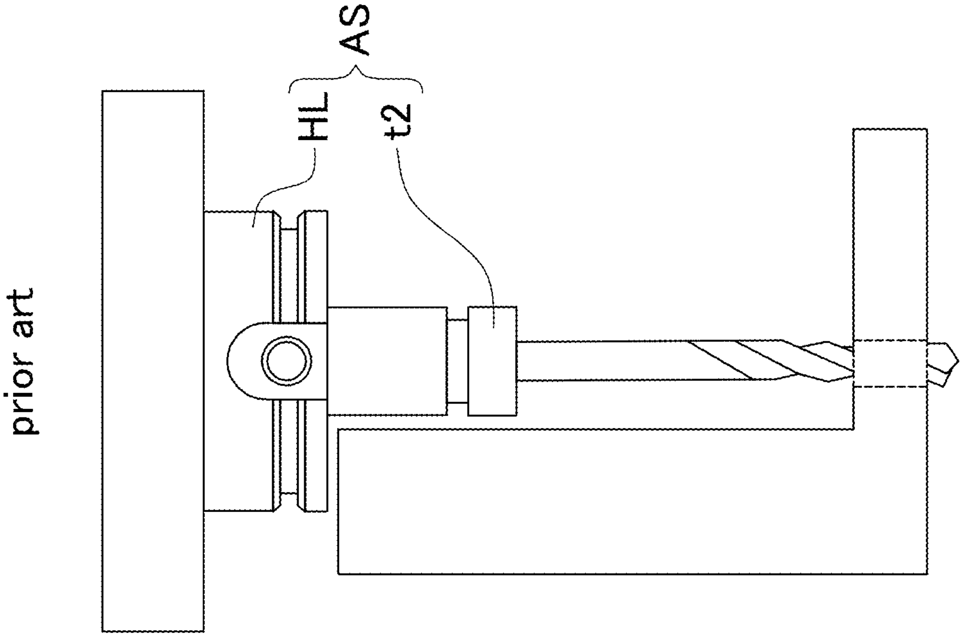
FIG. 2B is an explanatory view when the cutting tool is changed to the cutting tool having the same diameter but the different edge length, and illustrates a state after the change.
Figure 3:
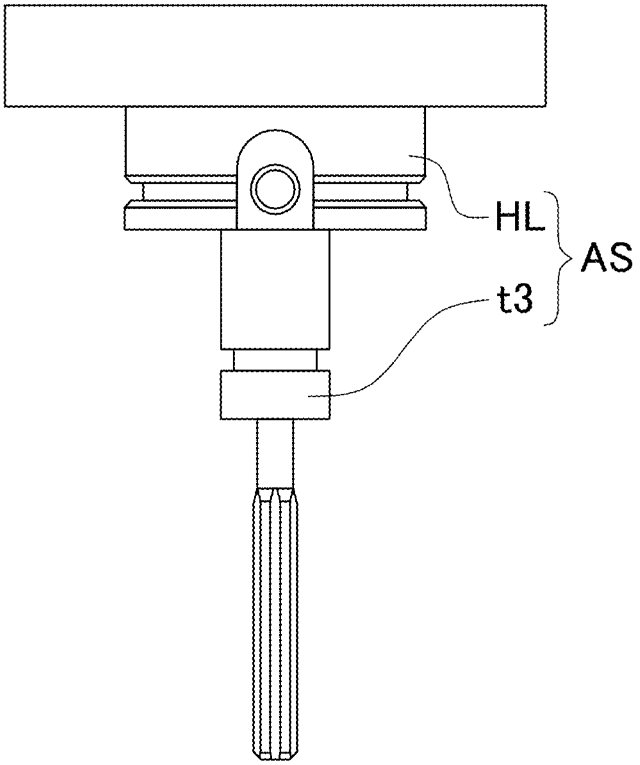
FIG.3 prior art
FIG. 3 is an explanatory view when the cutting tool is replaced with a cutting tool of a different type.

Here, an identifier generation unit 17 is disposed in the tool management device 1, and the identifier generation unit 17 can automatically generate the unique identification information. The functions of the configuration unit that overlap with those in FIG. 1 are the same as those of the above-described configuration.

The tool information database 11 can store each of a tool compensation value 120 obtained by measuring the tool, pot information 121 including a pot number of the tool magazine of the machine tool, service life information 122 of the tool, a cutting condition 123, and a tool specification 124.

An automatic recognition tag generating device 4 is connected to the network 3. For example, a one-dimensional barcode, a two-dimensional barcode, RFID, or a character is automatically generated as the tool holder ID 111 by the automatic recognition tag generating device 4, and is attached to the tool holder HL.

A tool presetter 5 and a machine tool 6 with a numerical control unit are also connected to the network 3. The machine tool 6 is provided with a reader for reading the automatic recognition tag of the tool holder HL when the assembled tool AS is mounted on the tool magazine. Accordingly, when the assembled tool AS is mounted on the tool magazine, the pot information 121 including the pot number indicating the mounted position is obtained and is managed by associating it with the assembled tool ID 113. Thus, the tool compensation value 120 measured by the tool presetter 5 can be accurately input to the machine tool 6. In addition, the service life information 122 is obtained from the machine tool 6 and is managed by associating it with the assembled tool ID 113. Thus, an appropriate service life management can be performed.

Furthermore, managing the cutting condition 123 and the tool specification 124 by associating them with the assembled tool ID 113 enables not only setting an appropriate cutting condition when a program is generated, but also enables coordinating with an automation system that uses a robot. Coupling the network 3 to an internet 7 enables always obtaining the latest accurate information.

In the above-described configuration and the modification example, the tool management system is formed by disposing the information input and output terminal serving as an information input and output unit separately from the tool management device, and coupling the information input and output terminal to the tool management device via the network. However, a tool management device according to a second configuration of the disclosure may have the information input and output unit disposed in the tool management device itself and be able to directly input and output data.

In the above-described configuration and the modification example, when the assembled tool state flag is OFF when the unique identification information of the tool holder is read, the assembled tool is made by combining the tool holder without the cutting tool and the desired cutting tool. However, thus newly making the assembled tool requires a confirmation work whether there is any machining problems.

Accordingly, in the case of the repeated machining, the assembled tool ID that has been used in the machining may be retrieved from the workpiece information, and the desired cutting tool may be mounted on the same tool holder that has been used with the assembled tool. Thus, using the same configuration as that of the assembled tool that has a record enables omitting the confirmation work.

While in the above-described configuration and the modification example, the reader is employed as the input unit, but the input unit is not limited to the reader. For example, a keyboard may be used. That is, when the unique identification information is given in numbers or characters, simply input them using the keyboard.

On the other hand, in the above-described configuration, when it is confirmed that there is no cutting tool mounted on the tool holder, the unique identification information becomes the tool holder ID to refer to the tool holder information. However, it is also allowed to generate the assembled tool ID in advance if it is okay to consume a data size.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A tool management system comprising:

a tool management device that manages an assembled tool including a tool holder and a cutting tool mounted on the tool holder; and an information input and output terminal configured to input and output data to/from the tool management device, wherein the tool management device includes:

a tool information database that stores at least: a tool holder ID as unique identification information directly attached to the tool holder; tool holder information as information relating to the tool holder; an assembled tool ID as unique identification information of the assembled tool; machine information as information relating to a machine tool that uses the assembled tool; workpiece information as information relating to a workpiece that has been machined using the assembled tool; cutting tool information as information relating to the cutting tool; a projection amount of the cutting tool from the tool holder in the assembled tool; and an assembled tool state flag turned ON when the cutting tool is mounted on the tool holder and turned OFF when the cutting tool is removed;

an assembled tool ID generation unit that generates the assembled tool ID in a record including the tool holder ID in the tool information database when the cutting tool is mounted on the tool holder;

a data retrieval unit that retrieves necessary information from the tool information database; and an assembled tool determination unit that determines whether the tool holder is holding the cutting tool or not, wherein the information input and output terminal includes an input unit for the tool holder ID, the assembled tool determination unit determines that the tool holder is holding the cutting tool when the tool holder ID is input by the input unit with the assembled tool state flag being in an ON state, and determines that the tool holder is not holding the cutting tool when the tool holder ID is input by the input unit with the assembled tool state flag being in an OFF state, and the data retrieval unit retrieves the assembled tool ID including the input tool holder ID to make information relating to the same assembled tool referable when the assembled tool determination unit has determined that the tool holder is holding the cutting tool, and retrieves the input tool holder ID to make information relating to the same tool holder referable when the assembled tool determination unit has determined that the tool holder is not holding the cutting tool.

2. The tool management system according to claim 1, wherein the assembled tool determination unit refers to a latest record among records including the corresponding tool holder ID when the tool holder ID is input.

3. The tool management system according to claim 1, wherein the assembled tool ID generation unit adds a record with the assembled tool ID and the cutting tool information having been changed to the tool information database when the configuration of the assembled tool is changed.

4. The tool management system according to claim 3, wherein the assembled tool ID generation unit adds a record with the assembled tool ID and the projection amount having been changed when the projection amount is changed in the assembled tool.

5. The tool management system according to claim 1, further comprising a tool number generation unit that assigns a tool number for a machine tool to identify to the assembled tool, wherein when the data retrieval unit has retrieved the assembled tool including the same tool holder and the same cutting tool, the tool number generation unit is allowed to assign the same tool number as the retrieved assembled tool.

6. The tool management system according to claim 5, wherein the tool number generation unit is configured to set the tool number for each of the machine tools.

7. The tool management system according to claim 5, wherein the data retrieval unit is configured to retrieve the assembled tool used in machining for each workpiece.

8. A tool management device that manages an assembled tool including a tool holder and a cutting tool mounted on the tool holder, the tool management device comprising:

a tool information database that stores at least: a tool holder ID as unique identification information directly attached to the tool holder; tool holder information as information relating to the tool holder; an assembled tool ID as unique identification information of the assembled tool; machine information as information relating to a machine tool that uses the assembled tool; workpiece information as information relating to a workpiece that has been machined using the assembled tool; cutting tool information as information relating to the cutting tool; a projection amount of the cutting tool from the tool holder in the assembled tool; and an assembled tool state flag turned ON when the cutting tool is mounted on the tool holder and turned OFF when the cutting tool is removed;

an information input and output unit that includes an input unit for the tool holder ID and is configured to input and output each piece of data to/from the tool information database;

an assembled tool ID generation unit that generates the assembled tool ID in a record including the tool holder ID in the tool information database when the cutting tool is mounted on the tool holder;

a data retrieval unit that retrieves necessary information from the tool information database; and an assembled tool determination unit that determines whether the tool holder is holding the cutting tool or not, wherein the assembled tool determination unit determines that the tool holder is holding the cutting tool when the tool holder ID is input by the input unit with the assembled tool state flag being in an ON state, and determines that the tool holder is not holding the cutting tool when the tool holder ID is input by the input unit with the assembled tool state flag being in an OFF state, and the data retrieval unit retrieves the assembled tool ID including the input tool holder ID to make information relating to the same assembled tool referable when the assembled tool determination unit has determined that the tool holder is holding the cutting tool, and retrieves the input tool holder ID to make information relating to the same tool holder referable when the assembled tool determination unit has determined that the tool holder is not holding the cutting tool.

* * * * *